(12) United States Patent  
Park et al.

(10) Patent No.: US 8,483,118 B2  
(45) Date of Patent: Jul. 9, 2013

(54) METHOD FOR TRANSMITTING A SIGNAL USING A RELAY STATION IN A WIRELESS COMMUNICATION SYSTEM

(75) Inventors: Kyu Jin Park, Anyang-si (KR); Ji Wook Chung, Anyang-si (KR); Doo Hyun Sung, Anyang-si (KR); Han Gyu Cho, Anyang-si (KR); Jin Sam Kwak, Anyang-si (KR); Eun Jong Lee, Anyang-si (KR); Ae Ran Youn, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 240 days.

(21) Appl. No.: 12/936,196

(22) PCT Filed: Apr. 3, 2009

(86) PCT No.: PCT/KR2009/001715  
§ 371 (c)(1),  
(2), (4) Date: Dec. 13, 2010

(87) PCT Pub. No.: WO2009/145484  
PCT Pub. Date: Dec. 3, 2009

(65) Prior Publication Data  
US 2011/0096715 A1  Apr. 28, 2011

Related U.S. Application Data

(60) Provisional application No. 61/042,270, filed on Apr. 4, 2008, provisional application No. 61/060,110, filed on Jun. 9, 2008.

(30) Foreign Application Priority Data

Mar. 31, 2009 (KR) .................. 10-2009-0027441

(51) Int. Cl.  
*H04J 1/10* (2006.01)

(52) U.S. Cl.  
USPC ............................................ 370/315; 370/310

(58) Field of Classification Search  
USPC ................. 370/252, 310, 315, 328, 329, 338, 370/346, 335, 351, 345, 445; 455/11.1, 512, 455/448, 560, 7, 424, 452.1; 375/211, 260  
See application file for complete search history.

(56) References Cited

U.S. PATENT DOCUMENTS 7,986,645 B2 * 7/2011 Yu et al. .................. 370/279  
2006/0046643 A1   3/2006 Izumikawa et al.

(Continued)

FOREIGN PATENT DOCUMENTS

CN    1984494    6/2007  
CN    101072065  11/2007  
CN    101132565  2/2008

OTHER PUBLICATIONS

Tao, J.Z., et al., "An Adaptive Frame Structure of OFDMA-based Mobile Multi-Hop Relay Networks," IEEE 802.16j Mobile Multihop Relay Task Group, IEEE C802.16j-07/117, Jan. 8, 2007.

(Continued)

*Primary Examiner* — Abdullah Riyami  
(74) *Attorney, Agent, or Firm* — Lee, Hong, Degerman, Kang & Waimey

(57) ABSTRACT

A method of transmitting a signal using a relay station is disclosed. In a wireless communication system, the present invention includes the steps of enabling the relay station to receive the signal via a relay interval in a downlink interval using a first wireless communication scheme and a second wireless communication scheme in common from a base station and enabling the relay station to transmit the received signal to a first terminal using the first wireless communications scheme via a first downlink interval in the downlink interval or to a second terminal using the second wireless communication scheme via a second downlink interval.

15 Claims, 15 Drawing Sheets

U.S. PATENT DOCUMENTS

| | | | |
|---|---|---|---|
| 2006/0205340 A1* | 9/2006 | Cho et al. | 455/11.1 |
| 2007/0153734 A1* | 7/2007 | Lee et al. | 370/329 |
| 2007/0155315 A1 | 7/2007 | Lee et al. | |
| 2008/0075094 A1* | 3/2008 | Ahn et al. | 370/400 |
| 2008/0095195 A1* | 4/2008 | Ahmadi et al. | 370/478 |
| 2008/0227386 A1* | 9/2008 | Dayal et al. | 455/7 |
| 2008/0227461 A1* | 9/2008 | Dayal et al. | 455/452.2 |
| 2008/0285500 A1* | 11/2008 | Zhang et al. | 370/315 |
| 2009/0163218 A1* | 6/2009 | Liu et al. | 455/450 |
| 2009/0163220 A1* | 6/2009 | Liu et al. | 455/452.1 |
| 2009/0180410 A1* | 7/2009 | Lee et al. | 370/294 |
| 2009/0303918 A1* | 12/2009 | Ma et al. | 370/315 |
| 2010/0039947 A1* | 2/2010 | Li et al. | 370/252 |

OTHER PUBLICATIONS

Shrestha, D.M., et al., "New Approaches for Relay Selection in IEEE 802.16 Mobile Multi-Hop Relay Networks," Proceedings of the 13th Annual International Euro-Par Conference in Parallel Processing—Lecture Notes in Computer Science, vol. 4641/2007, pp. 950-59, Aug. 2007.

* cited by examiner

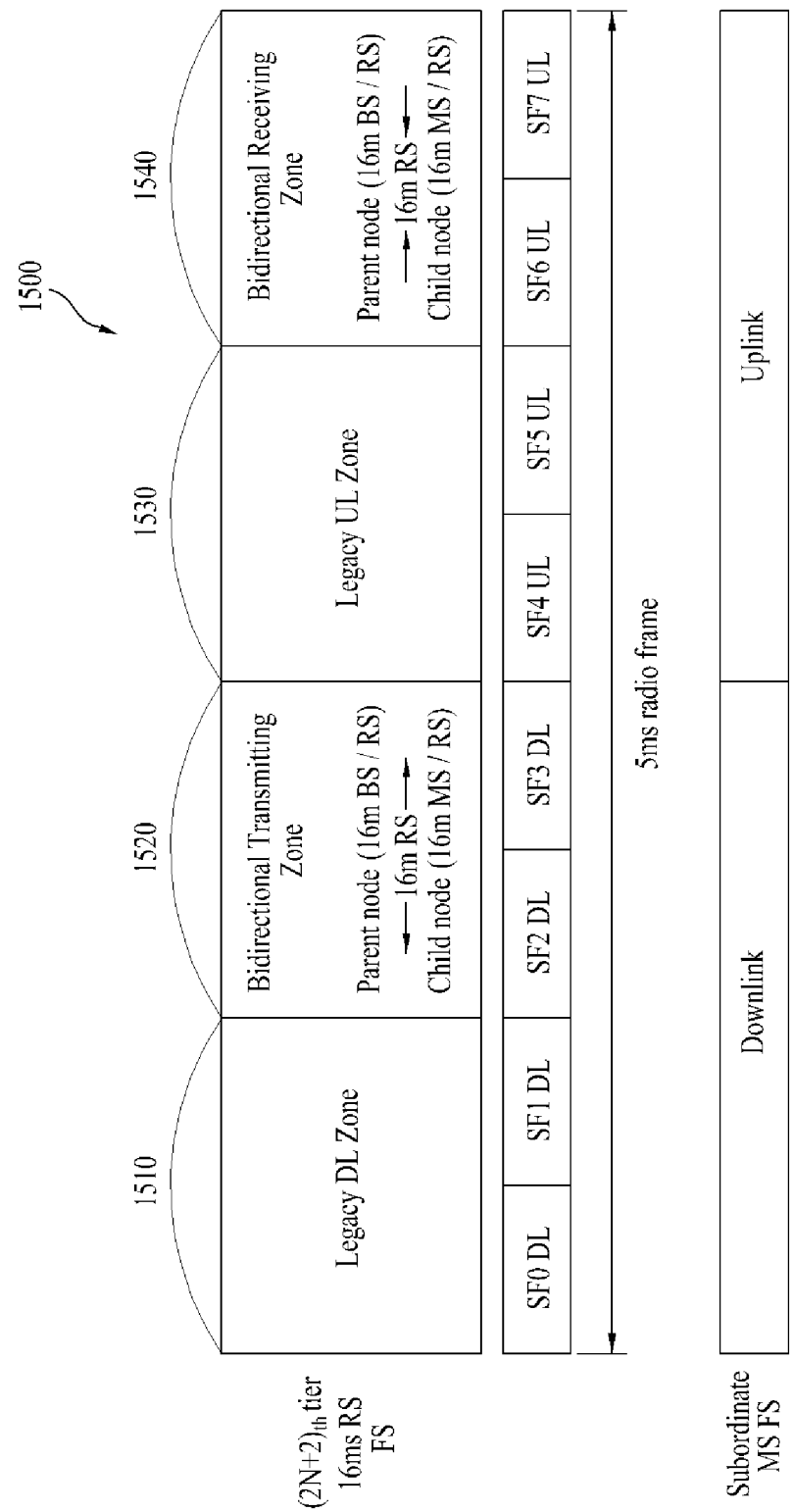

METHOD FOR TRANSMITTING A SIGNAL USING A RELAY STATION IN A WIRELESS COMMUNICATION SYSTEM

CROSS-REFERENCE TO RELATED APPLICATIONS

This application is the National Stage filing under 35 U.S.C. 371 U.S. of International Application No. PCT/KR2009/001715, filed on Apr. 3, 2009, which claims the benefit of earlier filing date and right of priority to Korean Application No. 10-2009-0027441, filed Mar. 31, 2009, and also claims the benefit of U.S. Provisional Application Ser. Nos. 61/042,270, filed on Apr. 4, 2008, and 61/060,110, filed on Jun. 9, 2008, the contents of all of which are incorporated by reference herein in their entireties.

TECHNICAL FIELD

The present invention relates to a signal transmitting method, and more particularly, to a method of transmitting a signal using a relay station.

BACKGROUND ART

Generally, since signaling transceiving is performed via a direct link between a fixed base station and a mobile station in a wireless communication system, it is facilitated to configure a highly-reliable wireless communication link between a base station and a mobile station. Yet, since a location of a base station may be fixed in a wireless communication system, a wireless network configuration is less flexible. Moreover, in a wireless environment having a considerable fluctuation of traffic distribution or call demand level, it is difficult to provide an efficient communication service. In order to overcome these disadvantages, it is able to apply a multi-hop type data transfer scheme to a general cellular wireless communication system using a fixed relay station, a mobile relay station or general mobile stations.

A wireless communication system, which adopts a multi-hope relay scheme, is able to reconfigure a network to promptly cope with a communication environment change and is also able to operate and manage an overall wireless network more efficiently.

For instance, a wireless communication system, which adopts a multi-hop relay station scheme, extends a cell service area and increases a system capacity. In particular, if a channel status between a base station and a mobile station is poor, it is able to provide the mobile station with a wireless channel having a better channel status by configuring a multi-hop relay station path via a relay station by establishing the relay station between the base station and the mobile station. Moreover, by applying a multi-hop relay station scheme to a cell boundary area having a poor channel status from a base station, it is able to provide a faster data channel and it is also able to extend a cell service area.

A relay station is the technology introduced for eliminating a shade area in a mobile communication system and is widely used. Compared to an old system which is limited to a repeater function of sending a signal by simply amplifying the signal, a current system has evolved into a more intelligent system.

Moreover, a relay station technology is mandatory for a next generation communication system to reduce a cost for an extension of base station installations and a maintenance cost of a back hole communication network and is also mandatory for a service coverage enlargement and a data processing rate enhancement. As the relay station technology is further developed, it is necessary for a new wireless communication system to support a relay station used for a conventional wireless communication system.

A legacy system is the system that follows a conventional specification and corresponds to a conventional system. For instance, IEEE 802.16e system corresponds to a legacy system as well. Yet, the legacy system is not limited to the IEEE 802.16e system only. It is able to install a new system evolved further from a previous system in a region where a legacy system is installed. In this case, the new system should be able to support a service for both of a legacy terminal and a new mobile station.

DISCLOSURE OF INVENTION

Technical Problem

Thus, a relay station in IEEE 802.16m system should be able to support a relay station in IEEE 802.16j system. A frame configuring method for supporting this legacy relay station has not been defined yet. Moreover, a frame configuring method for multi-hop support has not been defined yet.

Technical Solution

Accordingly, the present invention is directed to a method of transmitting a signal using a relay station that substantially obviates one or more of the problems due to limitations and disadvantages of the related art.

An object of the present invention is to provide to a method for transmitting a signal using a relay station in a wireless communication system.

Another object of the present invention is to provide to a method of transmitting a signal using a multi-hop relay station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in a wireless communication system, a method for transmitting a signal using a relay station according to the present invention includes receiving, at the relay station, the signal via a relay interval in a downlink interval using a first wireless communication scheme and a second wireless communication scheme in common from a base station, and transmitting, at the relay station, the received signal to a first mobile station using the first wireless communications scheme via a first downlink interval in the downlink interval or to a second mobile station using the second wireless communication scheme via a second downlink interval.

To further achieve these and other advantages and in accordance with the purpose of the present invention, in a wireless communication system, a method for transmitting a signal using a relay station includes receiving, at the relay station, the signal from a first mobile station using a first wireless communication scheme via a first uplink interval in an uplink interval, and the signal from a second mobile station using a second wireless communication scheme via the first uplink interval or a second uplink interval, and transmitting, at the relay station, the signal to a base station via a relay interval using the first wireless communication scheme and the second wireless communication scheme in common in the uplink interval.

To further achieve these and other advantages and in accordance with the purpose of the present invention, in a wireless communication system, a method for transmitting a signal using a multi-hop relay station includes receiving, at the relay station, the signal from a base station or a superordinate relay station located above a node having the relay station located thereat via a prescribed common interval in a downlink or uplink interval, and the signal from a subordinate mobile station or a subordinate relay station, and transmitting, at the relay station, the signal to the base station or the superordinate relay station via the prescribed common interval in the downlink or uplink interval, and the signal to the subordinate mobile station or the subordinate relay station.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, the present invention is able to support a function of a legacy relay station.

Secondly, the present invention is able to support a multi-hop relay station system.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 15 is a diagram for an example of a frame structure of a relay station supporting a multi-hop relay station and an example of a frame structure of a subordinate terminal.

MODE FOR THE INVENTION

Figure 1:
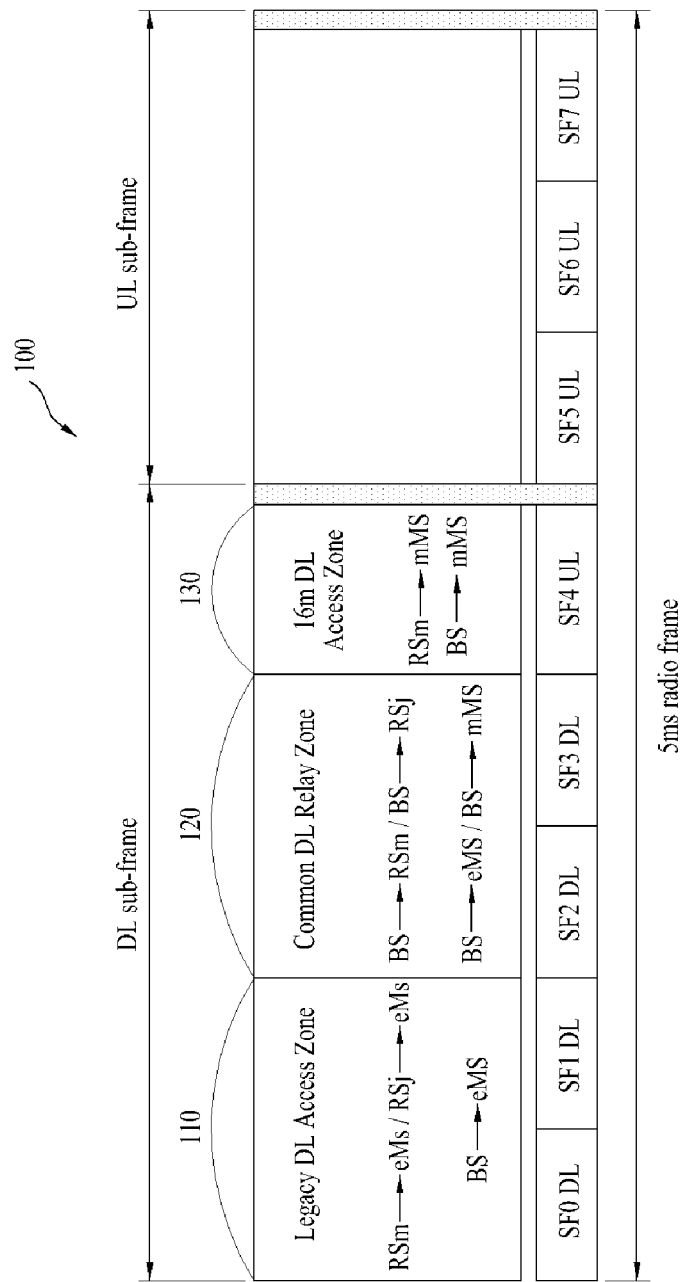
FIG. 1 is a diagram for an example of a downlink frame structure of a base station in a wireless communication system that supports a legacy relay station.

Reference will now be made in detail to the preferred embodiments of the present invention, examples of which are illustrated in the accompanying drawings. In the following detailed description of the invention includes details to help the full under-standing of the present invention. Yet, it is apparent to those skilled in the art that the present invention can be implemented without these details. For instance, although the following descriptions are made centering on predetermined terminologies, they need not to be limited to the terminologies. If the following descriptions are made using random terminologies, the same meanings can be provided. Wherever possible, the same reference numbers will be used throughout the drawings to refer to the same or like parts.

The following descriptions are applicable to various communication systems, which are capable of providing various communication services of audio data, packet data and the like. The technology of the communication system is usable in downlink or uplink.

In this case, 'base station' can be replaced by such a terminology as a fixed station, a Node B, an eNode B (eNB), an access point and the like. And, 'mobile station (MS)' can be replaced by such a terminology as a user equipment (UE), a subscriber station (SS), a mobile subscriber station (MSS)', a mobile terminal and the like.

A transmitting end refers to a node which transmits a data or voice service and a receiving end refers to a node which receives a data or voice service. Therefore, in uplink, a mobile station may correspond to the transmitting end and a base station may correspond to the receiving end. Similarly, in downlink, the mobile station may correspond to the receiving end and the base station may correspond to the transmitting end.

Meanwhile, a mobile station of the present invention can include a PDA (personal digital assistant), a cellular phone, a PCS (personal communication service) phone, a GSM (global system for mobile) phone, a WCDMA (wideband CMDA) phone, an MBS (mobile broadband system) phone or the like.

In the following descriptions, a relay station (RS) of IEEE (Institute of Electrical and Electronics Engineers) 802.16m system shall be named 'RSm' or '16m relay station'. A mobile station of the IEEE 802.16m system shall be named 'mMS', '16m mobile station' or a mobile station. A relay station of IEEE 802.16j system shall be named 'RSj', '16j relay station', or 'legacy relay station'. And, a mobile station of IEEE 802.16e system shall be named 'eMS', '16e mobile station' or 'legacy mobile station'.

Frame is a data sequence during a fixed time used by a physical option. OFDMA (orthogonal frequency division multiple access) frame includes an uplink frame and a downlink frame. Time division duplex (TDD) is a bidirectional transmission scheme for alternately allocating uplink and downlink on a same frequency band temporally. Theoretically, the TDD has transmission efficiency higher than that of FDD for assigning two different frequencies to uplink and downlink, respectively. Since the timeslot is dynamically allocated in TDD scheme, it is suitable for asynchronous or burst application transmission. Yet, since communication is performed on a same frequency, the TDD needs to consider interference influence more than that of the FDD.

Frequency division duplex (FDD) is a scheme for assigning different frequency bands to an uplink and a downlink for bidirectional communications, respectively. Since different frequency bands are used, there occurs less interference in-between. Yet, the FDD requires a frequency band twice wider than that of the TDD.

A downlink frame is temporally ahead of an uplink frame. TTG (transmit/receive transition gap) is a gap between a downlink burst and an uplink burst consecutive thereto. RTG (receive/transmit transition gap) is a gap between an uplink burst and a downlink burst consecutive thereto. A preamble can be provided to a head part of a frame for synchronization acquisition of a mobile station, base station identification and synchronization setup through channel estimation of a mobile station.

In a wireless communication system environment, a channel status irregularly changes on a time domain and a frequency domain, which is called fading. Therefore, a receiver corrects a received signal using channel information in order to reconstruct data transmitted from a transmitter and to obtain a correct signal.

In order for a wireless communication system to obtain channel information, a signal known to both a transmitter and a receiver is transmitted and an extent of distortion of the signal transmitted on a channel is then used. In this case, the corresponding signal is called a reference signal. And, how to find out the channel information is called channel estimation. The reference signal does not contain real data and has a high output.

In a wireless communication system using a relay station, in order for a base station to transmit a signal to a terminal via the relay station, the relay station needs to be synchronized with the base station. For this, the base station is able to periodically allocate a synchronization channel for relay stations to a downlink relay zone so that the relay station subordinate to the base station can be synchronized with the base station. Through the relay station synchronization channel, each relay station is able to match the synchronization with the base station to which the relay station is subordinate.

In this case, it is able to define a specific preamble for the relay station synchronization channel. And, the base station is able to allocate a relay station ranging channel for uplink synchronization of the relay station to an uplink relay zone. Moreover, the base station is able to define a ranging code for the relay station ranging channel.

In the following description, a method of configuring frames of a base station and a relay station for simultaneously supporting a legacy relay station is explained. And, a method of transmitting a signal using a relay station is explained.

FIG. 1 is a diagram for an example of a downlink frame structure of a base station in a wireless communication system that supports a legacy relay station.

Referring to FIG. 1, a frame includes a downlink subframe and an uplink subframe. In order to support a legacy relay station, a downlink subframe of a base station may include three zones. In particular, the downlink subframe of the base station may include a legacy downlink (DL) access zone 110, a common downlink (DL) relay zone 120 and a 16m downlink (DL) access zone 130. The legacy downlink access zone 110 can be allocated to a first subframe in the downlink subframes. The common downlink relay zone 120 and the 16m downlink access zone 130 can be then allocated to the rest of the downlink subframes, respectively.

The legacy downlink access zone 110 is an interval in which a base station or a relay station communicates with mobile stations. In the legacy downlink access zone 110, the base station can transmit a signal to a legacy mobile station (e.g., a 16e mobile station eMS) and a 16m relay station RSm or a 16j relay station RSj can transmit a signal to a legacy terminal (e.g., a 16e mobile station eMS). In doing so, the base station and the 16m relay station can use a 16e preamble which is the preamble in IEEE 802.16e system. Both of the base station and the 16m relay station can transmit the 16e preamble at the same OFDMA symbol time. In doing so, it is able to transmit the 16e preamble in a manner of fixing the 16e preamble to an nth OFDMA symbol of a first subframe.

The common downlink relay zone 120 is an interval in which a base station communicates with a mobile station (16m mobile station or 16e mobile station) or a relay station (16m relay station or 16j relay station). In the common downlink relay zone 120, a base station can transmit a signal to a 16m relay station RSm or a 16j relay station RSj. And, the base station can also transmit a signal to a 16e mobile station eMS or a 16m mobile station mMS.

The 16m downlink access zone 130 is an interval in which a base station or a 16m relay station communicates with 16m mobile stations. The 16m downlink access zone 130 can be allocated in a manner of including a last downlink subframe. In the 16m downlink access zone 130, a base station or a 16m relay station RSm can transmit a signal to a 16m mobile station mMS. The base station and the 16m relay station RSm can transmit a 16m preamble, which is a preamble in IEEE 802.16m system, to the 16 m mobile station. In this case, both of the base station and the 16m relay station RSm can transmit the 16m preambles at the same OFDMA symbol time. And, it can be collectively fixed the 16m preamble to an nth OFDMA symbol of a last downlink subframe. There can exist a common preamble set for the base station and the 16m relay station RSm. Alternatively, a preamble set for the base station and a preamble set for the 16m relay station RSm can separately exist.

The above-described three zones can be flexibly allocated according to a load and other situations. In this case, the base station or the 16m relay station RSm explicitly informs a subordinate 16m relay station RSm or a subordinate mobile station of the zone allocation by signaling. Alternatively, the base station or the 16m relay station RSm implicitly informs a subordinate 16m relay station RSm or a subordinate mobile station of the zone allocation by scheduling. Three operational modes of the above-described common downlink relay zone 120 are explained as follows.

Figure 2:
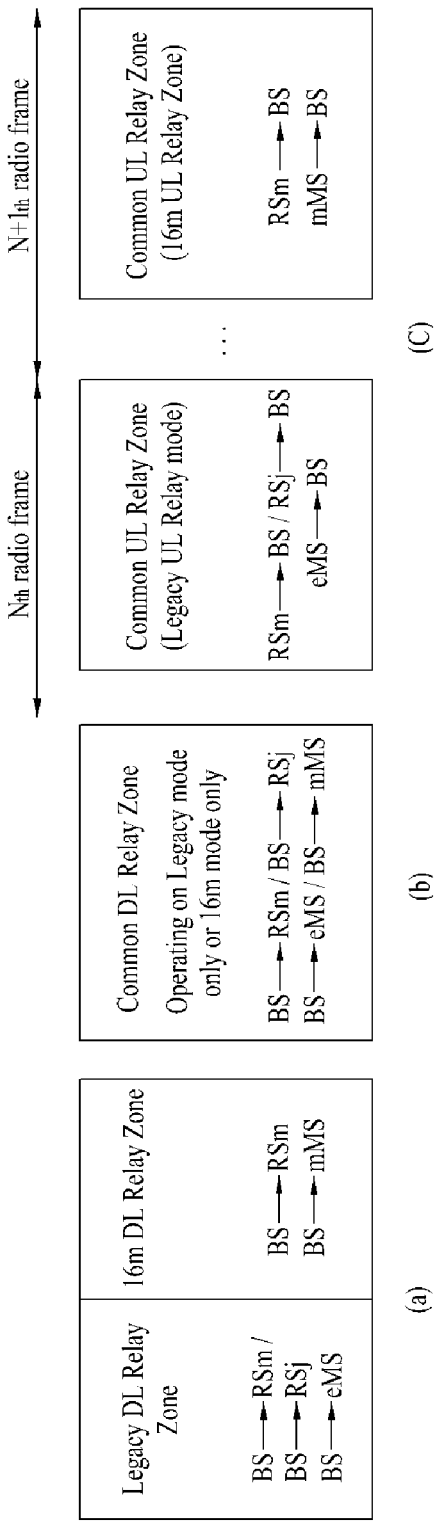
FIG. 2 is a diagram for downlink frame structures of a common downlink relay zone shown in FIG. 1 according to three modes.

FIG. 2 is a diagram for downlink frame structures of a common downlink relay zone shown in FIG. 1 according to three modes.

Referring to FIG. 2, a common downlink relay zone is operable in one of three modes. In this case, a base station or a 16m relay station RSm uses signaling to inform its mobile station 16m relay station RSm or mobile station that the common downlink relay zone operates in a specific one of the three modes.

Referring to (a) of FIG. 2, in a first mode, one common downlink relay zone can be divided into two zones including a legacy downlink (DL) relay zone and a 16m downlink (DL) relay zone. In this case, in the legacy downlink relay zone, a base station can transmit a signal to a 16m relay station RSm, a 16j relay station RSj or a 16e mobile station eMS. In the 16m downlink relay zone, a base station can transmit a signal to a 16m relay station RSm or a 16m mobile station mMS. Time division multiplexing (TDM) or frequency division multiplexing (FDM) is applied to the legacy downlink relay zone and the 16m downlink relay zone so that the two relay zones can be allocated to one common downlink relay zone.

Referring to (b) of FIG. 2, in a second mode, one common downlink relay zone is operable in a legacy mode only or 16m mode only. In particular, it is just operable in the legacy mode for operation with legacy features or the 16m mode for operation with 16m features.

If a common downlink relay zone is operable in a legacy mode only, a base station can transmit a signal to a 16m relay station RSm, a 16j relay station RSj or a 16e mobile station. On the contrary, if a common downlink relay zone is operable in a 16m mode only, a base station can transmit a signal to a 16m relay station or a 16m mobile station mMS. The legacy mode or the 16m mode is selectively applicable.

Referring to (c) of FIG. 2, in a third mode, for example, a legacy downlink relay zone can be allocated to a common downlink relay zone of an even radio frame and a 16m downlink relay zone can be allocated to a common downlink relay zone of an odd radio frame. In other words, the legacy downlink relay zone and the 16m downlink relay zone can be allocated in a manner of being switched per radio frame.

Figure 3:
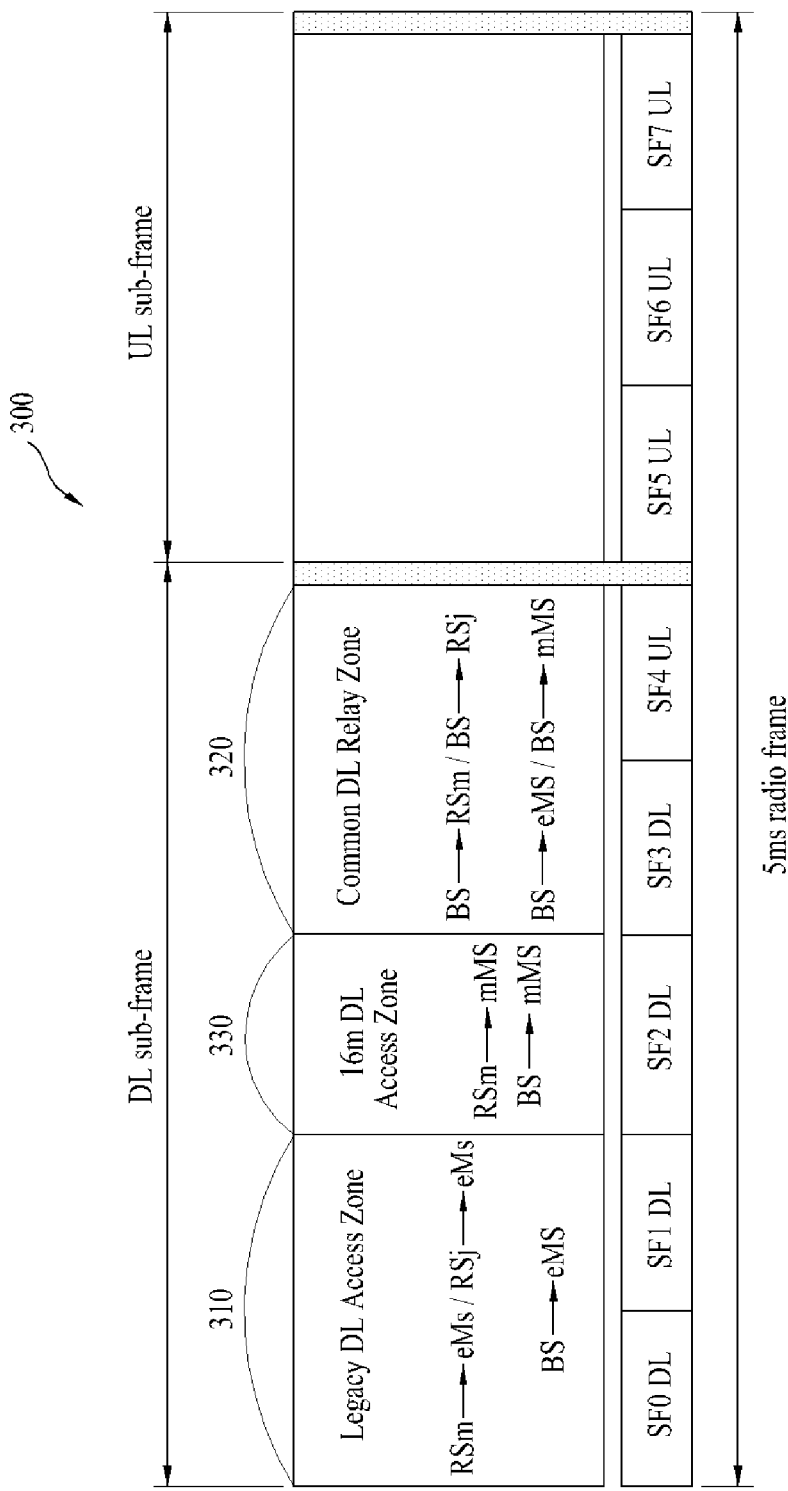
FIG. 3 is a diagram for an example of a downlink frame structure of a base station in a wireless communication system for supporting a legacy relay station.

FIG. 3 is a diagram for an example of a downlink frame structure of a base station in a wireless communication system for supporting a legacy relay station.

Referring to FIG. 3, a frame can include a downlink subframe and an uplink subframe. In the same manner of the frame structure shown in FIG. 1, a downlink subframe of a base station can be divided into three zones for a legacy relay station support. And, a downlink subframe of a base station can include a legacy downlink (DL) access zone 310, a 16m downlink (DL) access zone 320 and a common downlink (DL) relay zone 330.

Unlike the case shown in FIG. 1, the 16m downlink (DL) access zone 320 can exist ahead of the common downlink relay zone 330 temporally. Compared to the case shown in FIG. 1, in case that the 16m downlink (DL) access zone 320 is allocated behind the legacy downlink access zone 310, it can reduce two RRGs/RTGs in a relay station into one TTF/RTG.

In the legacy downlink access zone, a base station and a 16m relay station RSm can transmit a 16e preamble to a 16e mobile station. Yet, a 16m preamble may be changed according to a location of a 16m downlink relay zone. It can be fixed a 16m downlink relay zone to be allocated from an nth subframe. In this case, it is able to adopt the 16m preamble structure like the scheme described with reference to FIG. 1.

Besides, three zones in a downlink frame structure of a base station can be allocated in order different from the former order described with reference to FIG. 1 or FIG. 3.

Figure 4:
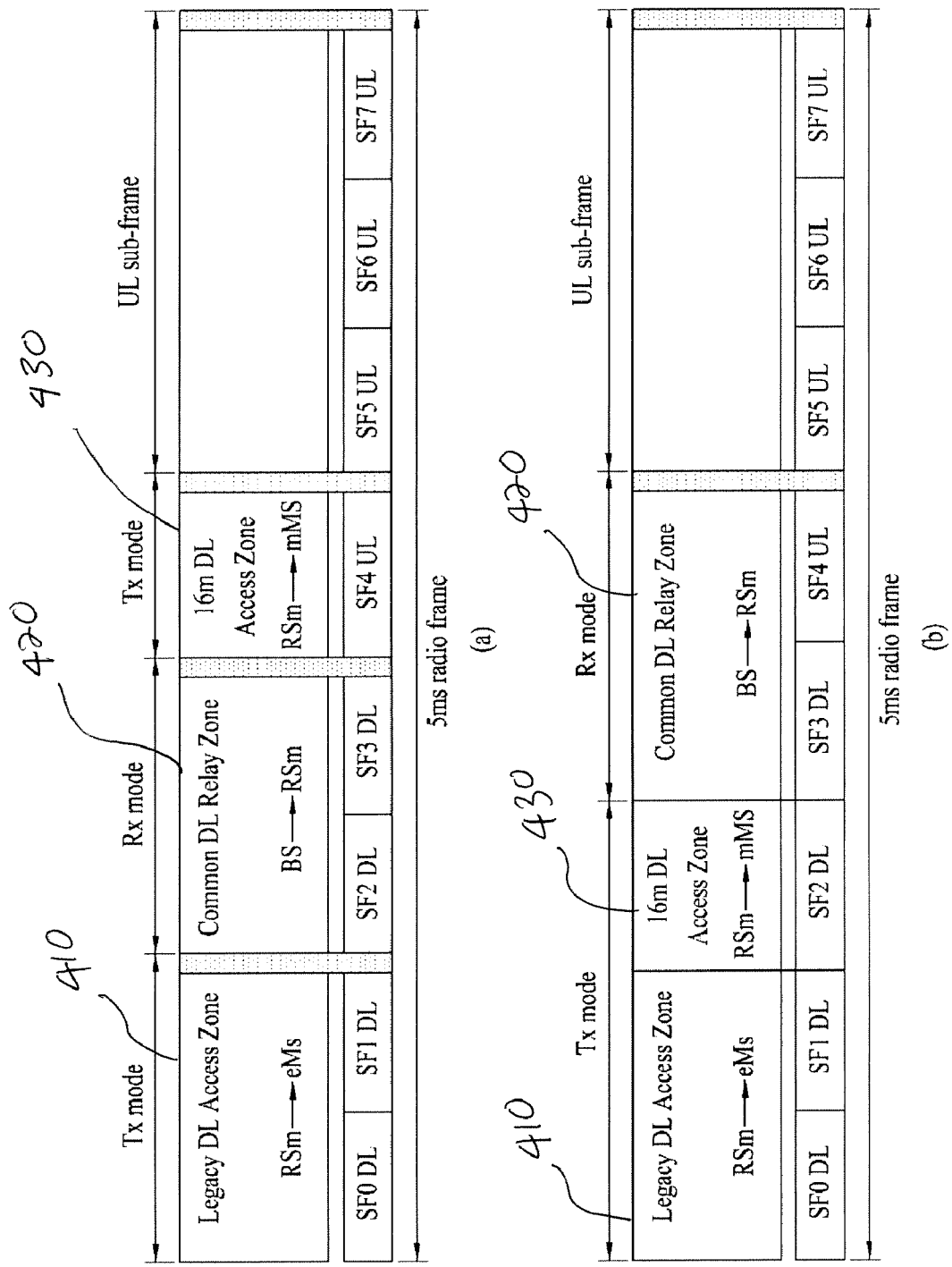
FIG. 4 is a diagram for an example of a downlink frame structure of a relay station in a wireless communication system for supporting a legacy relay station.

FIG. 4 is a diagram for an example of a downlink frame structure of a relay station in a wireless communication system for supporting a legacy relay station.

Referring to (a) of FIG. 4, a frame includes a downlink subframe and an uplink subframe. A downlink subframe of a relay station for a legacy relay station support can be divided into three zones. The downlink subframe of the relay station can include a legacy downlink (DL) access zone 410, a common downlink (DL) relay zone 420 and a 16m downlink (DL) access zone 430. The legacy downlink access zone 410 can be first allocated to a first subframe in the downlink subframes and the common downlink relay zone 420 and the 16m downlink access zone 430 can be then sequentially allocated to the rest of the subframes, respectively.

The legacy downlink access zone 410 is an interval in which a 16m relay station and a legacy mobile station communicate with each other. In the legacy downlink access zone 410, a 16m relay station RSm can transmit a signal to a legacy mobile station (e.g., a 16e mobile station). In this case, the legacy downlink access zone 410 is operative in a transmission mode (Tx mode).

The common downlink relay zone 420 is an interval in which a base station and a 16m relay station RSm communicate with each other. In the common downlink relay zone 420, a 16m relay station RSm can receive a signal from a base station. In this case, the downlink relay zone 420 is operative in a reception mode (Rx mode).

And, the 16m downlink (DL) access zone 430 is an interval in which a 16m relay station RSm and a mobile station communicate with each other. The 16m relay station RSm can transmit a signal to a 16m mobile station mMS. In this case, the 16m downlink (DL) access zone 430 is operative in a transmission mode. The 16m downlink (DL) access zone 430, as shown in (a) of FIG. 4, can be allocated to include a last downlink subframe. In the 16m downlink (DL) access zone 430, a base station or a 16m relay station RSm can transmit a signal to 16m mobile station mMS.

Referring to (b) of FIG. 4, in the frame structure shown in (a) of FIG. 4, a order of the common downlink relay zone 420 and the 16m downlink (DL) access zone 430 can be changed. In particular, the zones can be allocated in order of the legacy downlink access zone, the 16m downlink (DL) access zone 430 and the common downlink relay zone 420. Moreover, the three zones configuring the downlink frame of the relay station can be allocated to the downlink frame in temporally random order.

Figure 5:
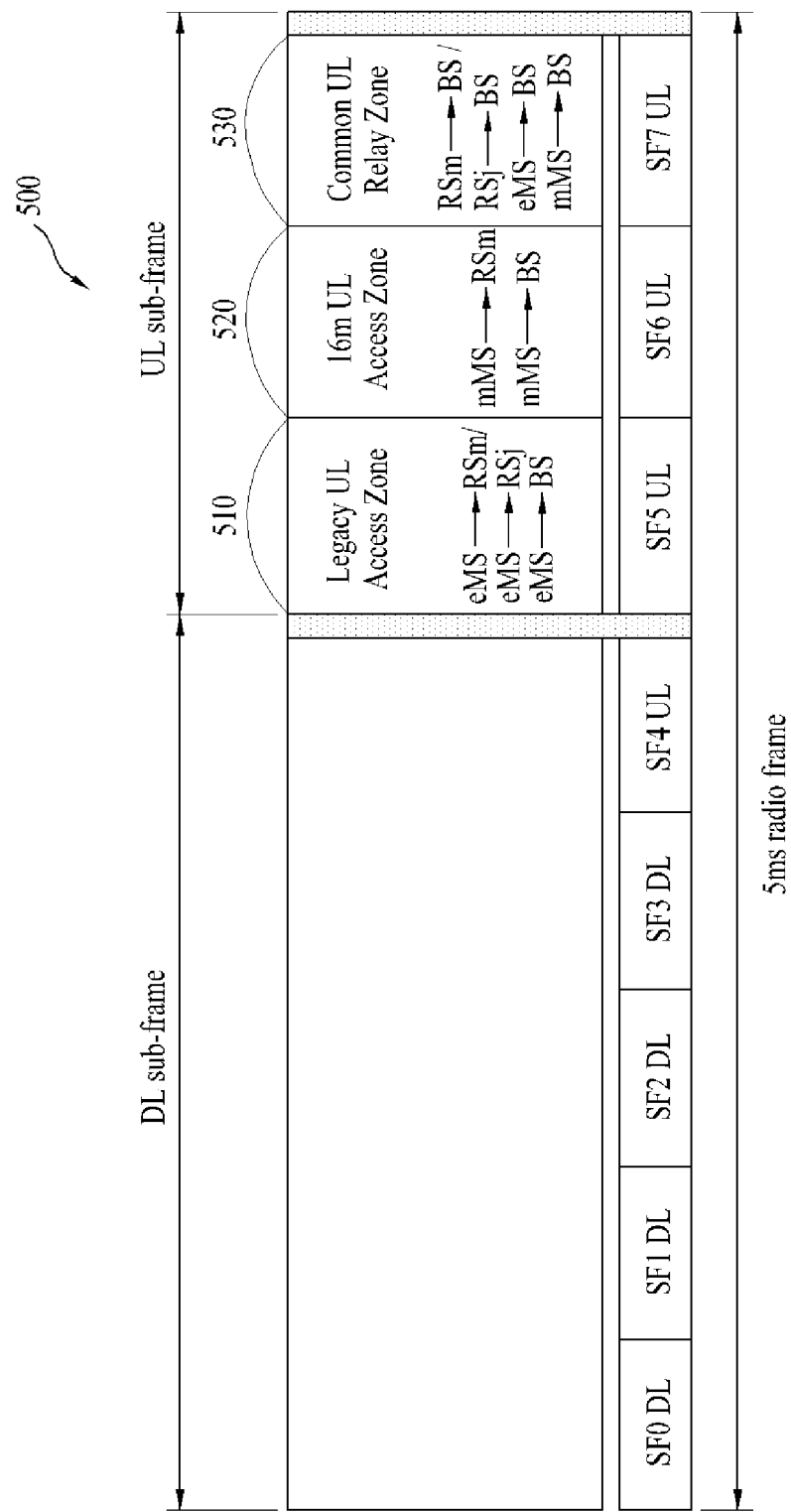
FIG. 5 is a diagram for an example of an uplink frame structure of a base station in a wireless communication system for supporting a legacy relay station.

FIG. 5 is a diagram for an example of an uplink frame structure of a base station in a wireless communication system for supporting a legacy relay station.

Referring to FIG. 5, an uplink subframe of a base station for a legacy relay station support can include three zones. The uplink subframe of the base station can include a legacy uplink (UL) access zone 510, a 16m uplink (UL) access zone 520 and a common uplink (UL) relay zone 530. The legacy uplink access zone 510 can be first allocated to a first subframe in a downlink subframe. Subsequently, the 16m uplink access zone 520 and the common uplink relay zone 530 can be allocated to the following subframes, respectively.

The legacy uplink access zone 510 is an interval in which a base station or a relay station communicates with mobile stations. In this zone, a 16e mobile station eMS can transmit a signal to a base station, a 16j relay station RSj or a 16m relay station RSm.

The 16m uplink access zone 520 is an interval in which a 16m terminal mMS communicates with a base station or a relay station. In the 16m uplink access zone 520, a 16m terminal mMS can transmit a signal to a base station or a 16m relay station RSm.

The common uplink relay zone 530 is an interval in which a base station communicates with a mobile station or a relay station. In the common uplink relay zone 530, a base station can transmit a signal to a 16m relay station RSm or a 16j relay station RSj. And, the base station can transmit a signal to a 16e mobile station eMS or a 16m mobile station mMS. This common uplink relay zone 530 is operable in one of three modes like the above-described common downlink relay zone. This is further explained in detail as follows.

Figure 6:
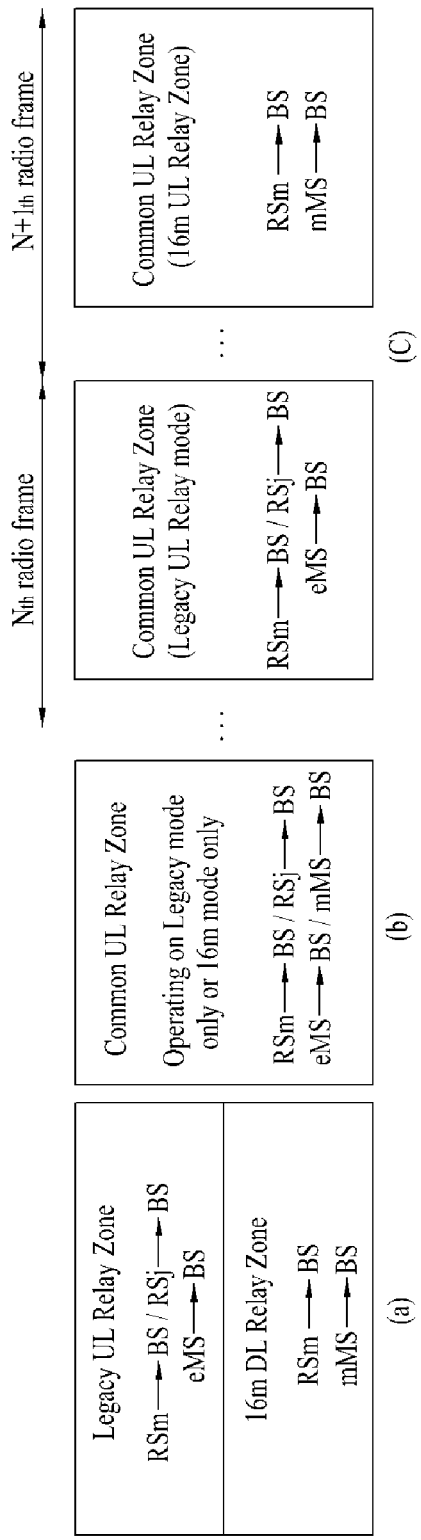
FIG. 6 is a diagram for uplink frame structures of a common uplink relay zone shown in FIG. 5 according to three modes.

FIG. 6 is a diagram for uplink frame structures of a common uplink relay zone shown in FIG. 5 according to three modes.

Referring to FIG. 6, a common uplink relay zone is operable in one of three modes. In this case, a base station or a 16m relay station RSm explicitly informs a subordinate 16m relay station RSm or a subordinate mobile station that a common uplink relay zone is operative in a prescribed mode by signaling. Alternatively, the base station or the 16m relay station RSm implicitly informs a subordinate 16m relay station RSm or a subordinate mobile station that a common uplink relay zone is operative in a prescribed mode by scheduling.

Referring to (a) of FIG. 6, in a first mode, one common uplink relay zone is operable by being divided into a legacy uplink (UL) relay zone and a 16m uplink (UL) relay zone. In this case, in the legacy uplink relay zone, a 16m relay station RSm, a 16j relay station RSj or a 16e mobile station eMS can transmit a signal to a base station. In the 16m uplink relay zone, a 16m relay station RSm or a 16m mobile station mMS can transmit a signal to a base station.

Time division multiplexing (TDM) or frequency division multiplexing is applied to the legacy uplink relay zone and the 16m uplink relay zone so that the legacy uplink relay zone and the 16m uplink relay zone can be allocated to one common uplink relay zone.

Referring to (b) of FIG. 6, in a second mode, one common uplink relay zone is operative in a legacy mode only or in a 16m mode only. In particular, one common uplink relay zone can operate in the legacy mode operative with legacy features only or in the 16m mode operative with 16 features only.

In case that a common uplink zone is operable in a legacy mode only, a 16m relay station RSm, a 16j relay station RSj or a 16e mobile station can transmit a signal to a base station. On the contrary, in case that a common uplink relay zone is operable in a 16m mode only, a 16m relay station or a 16m mobile station can transmit a signal to a base station. Besides, the legacy mode only or the 16m mode only, which is examined with reference to FIG. 6, is selectively applicable.

Referring to (c) of FIG. 6, in a third mode, for example, a legacy uplink relay zone can be allocated to a common uplink relay zone of an even radio frame. And, a 16m uplink relay zone can be allocated to a common uplink relay zone of an odd radio frame. In other words, the legacy uplink relay zone and the 16m uplink relay zone can be allocated in a manner of being switched per radio frame.

Figure 7:
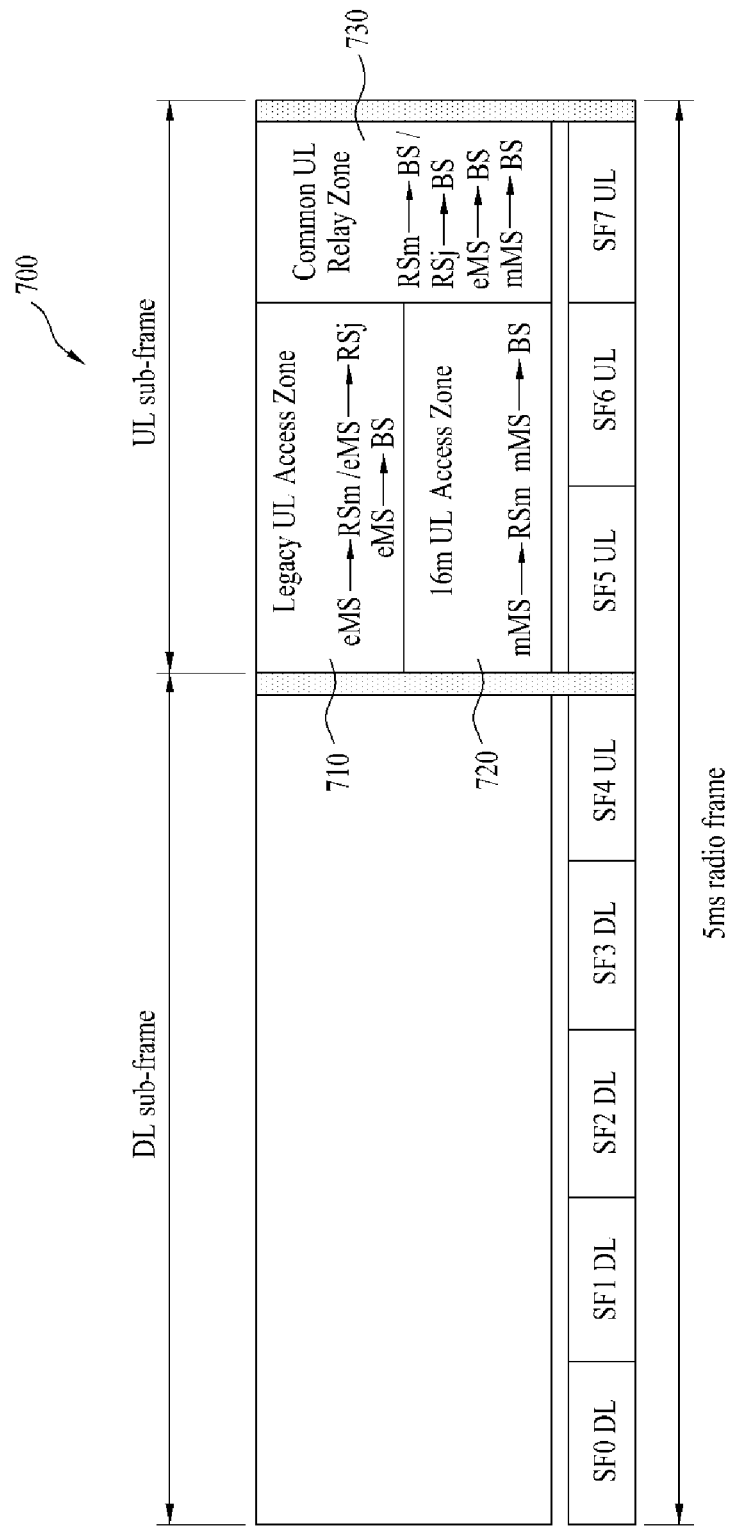
FIG. 7 is a diagram for an example of an uplink frame structure of a base station in a wireless communication system for supporting a legacy relay station.

FIG. 7 is a diagram for an example of an uplink frame structure of a base station in a wireless communication system for supporting a legacy relay station.

Referring to FIG. 7, for an uplink legacy support in an uplink frame of a base station, a legacy uplink access zone 710 and a 16m uplink access zone 720 is applied by FDM, whereas a common uplink relay zone 730 are applied by TDM.

On the contrary, looking into an uplink frame structure of a base station shown in FIG. 5, a legacy uplink access zone 510 is applied by TDM, a 16m uplink access zone 520 and a common uplink relay zone 530 are applied by FDM.

In the above description, the frame structures for the legacy relay station support are explained in case of the single hop. In the following description, frame structures for a multi-hop relay station shall be explained in detail.

First of all, a transmission between relay stations in an access zone is explained as follows.

In a downlink access zone, a forward transmission between relay stations (RS to RS) can be performed. In an uplink access zone, a backward transmission between relay stations can be performed. In a time domain, an access zone of a relay station corresponding to an odd-hop can be overlapped with a relay zone of an even-hop relay station. And, a relay zone of an odd-hop relay station can be overlapped with an access zone of an even-hop relay station. A relay station, which is located at a node distant from a base station by an odd hop, can be called an odd-hop relay station. And, a relay station, which is located at a node distant from a base station by an even hop, can be called an even-hop relay station.

Figure 8:
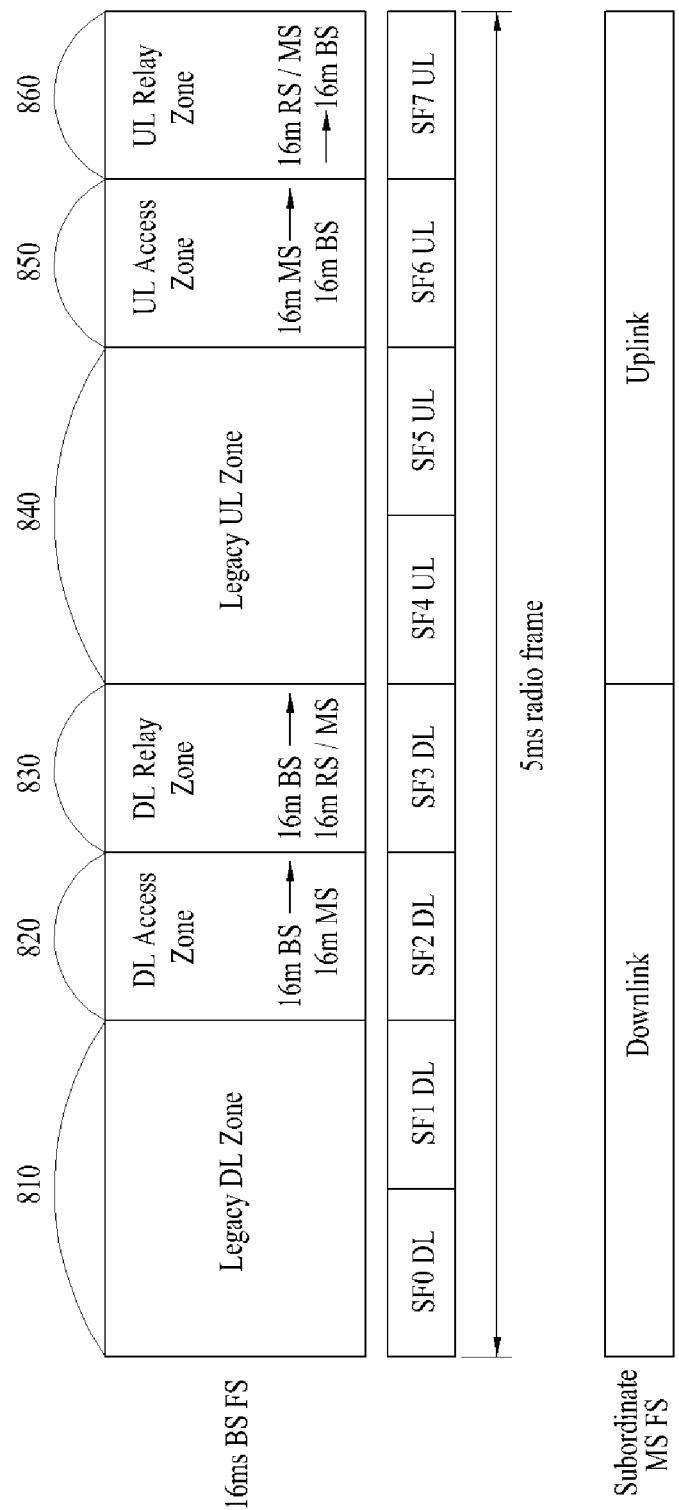
FIG. 8 is a diagram for an example of a frame structure of a base station supporting a multi-hop relay station and an example of a frame structure of a subordinate terminal.

FIG. 8 is a diagram for an example of a frame structure of a base station supporting a multi-hop relay station and an example of a frame structure of a subordinate mobile station.

Referring to FIG. 8, a frame includes a downlink subframe and an uplink subframe. An uplink frame in frames of a base station can include a legacy downlink (DL) access zone 810, a downlink (DL) access zone 820 and a downlink (DL) relay zone 830. And, an uplink frame in the frames of the base station can include a legacy uplink (UL) access zone 840, an uplink (UL) access zone 850 and an uplink (UL) relay zone 860.

The downlink access zone 820 is an interval in which a base station and a mobile station communicate with each other. In this zone, a base station can transmit a signal to a 16m mobile station.

The downlink relay zone 830 is an interval in which a base station communicates with a relay station or a mobile station. In this zone, a base station can transmit a signal to a 16m relay station or a 16m mobile station.

The uplink access zone 850 is an interval in which a mobile station and a base station communicate with each other. In this zone, a 16m mobile station can transmit a signal to a base station.

And, the uplink relay zone 860 is an interval in which a relay station or a mobile station and a base station communicate with each other. In this zone, a 16m relay station or a 16m mobile station can transmit a signal to a base station.

Figure 9:
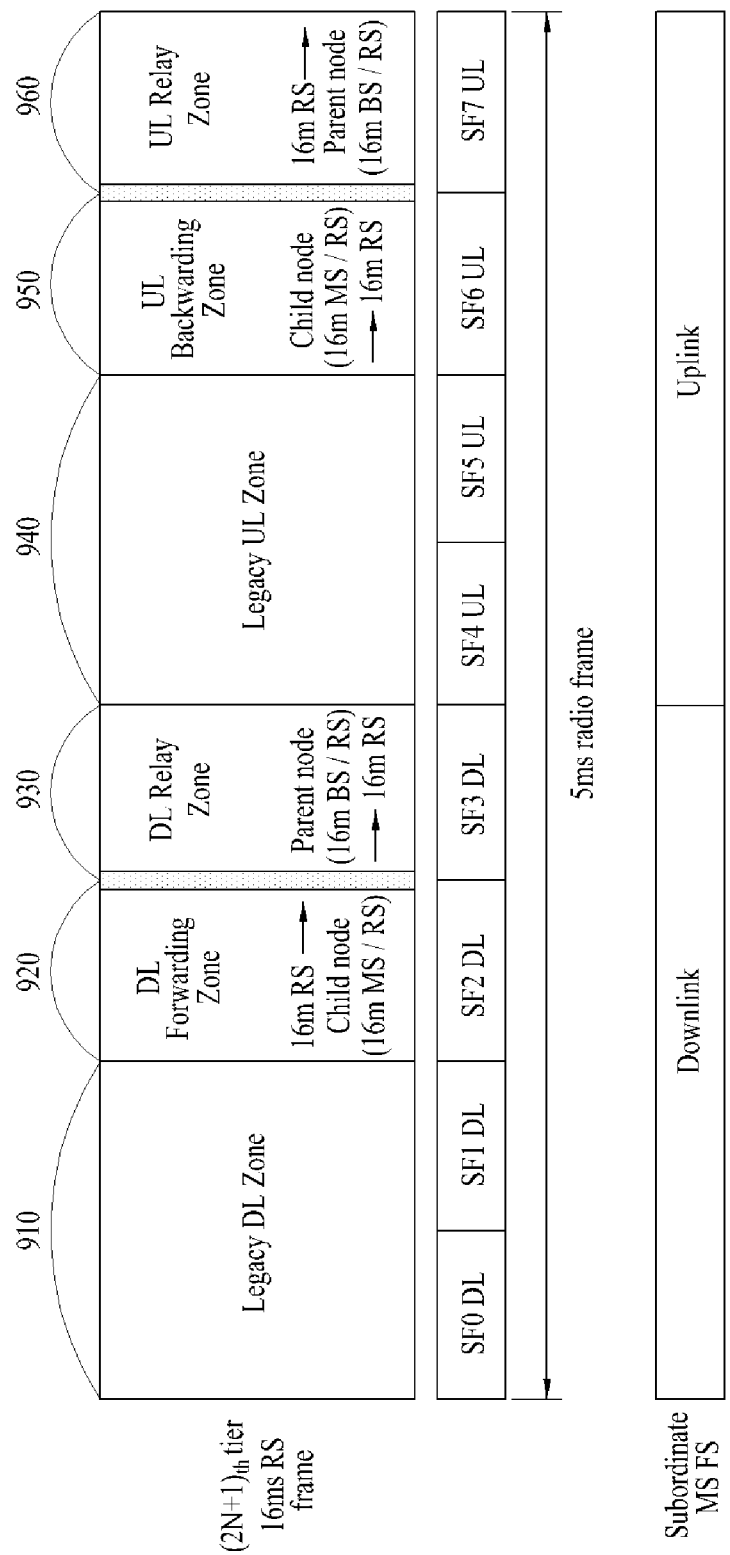
FIG. 9 is a diagram for an example of a frame structure of an odd-hop relay station and an example of a frame structure of a subordinate terminal.

FIG. 9 is a diagram for an example of a frame structure of an odd-hop relay station and an example of a frame structure of a subordinate mobile station.

Referring to FIG. 9, a downlink subframe of an odd-hop relay station can include a legacy downlink (DL) access zone 910, a downlink (DL) forwarding zone 920 and a downlink (DL) relay zone 930.

And, an uplink subframe of the odd-hop relay station can include a legacy uplink (UL) access zone 940, an uplink (UL) backwarding zone 950 and an uplink (UL) relay zone 960.

The downlink forwarding zone 920 is an interval in which a 16m relay station communicates with a 16m relay station or a 16m mobile station, which corresponds to its child node. In this case, the child node indicates a node (subordinate node) located below a node, at which a current relay station is located, by being subordinate thereto. In this zone, a 16m relay station can transmit a signal to a 16m relay station or a 16m mobile station corresponding to a child node.

The downlink relay zone 930 is an interval in which a 16m relay station or a base station communicates with a 16m relay station. A parent node indicates a node (superordinate node) located above the node at which the current relay station is located. In this zone, a base station or a 16m relay station, which is located above a specific 16m relay station and corresponds to a parent node, can transmit a signal to a subordinate 16m relay station.

The uplink (UL) backwarding zone 950 is an interval in which 16m relay station communicates with a 16m relay station or a 16m mobile station corresponding to its child node. In this zone, a 16m relay station or a 16m mobile station corresponding to a child node can transmit a signal to an upper 16m relay station.

And, the uplink relay zone 960 is an interval in which a 16m relay station or a base station communicates with a 16m relay station. A 16m relay station can transmit a signal to a 16m base station or a 16m relay station corresponding to its parent node.

Figure 10:
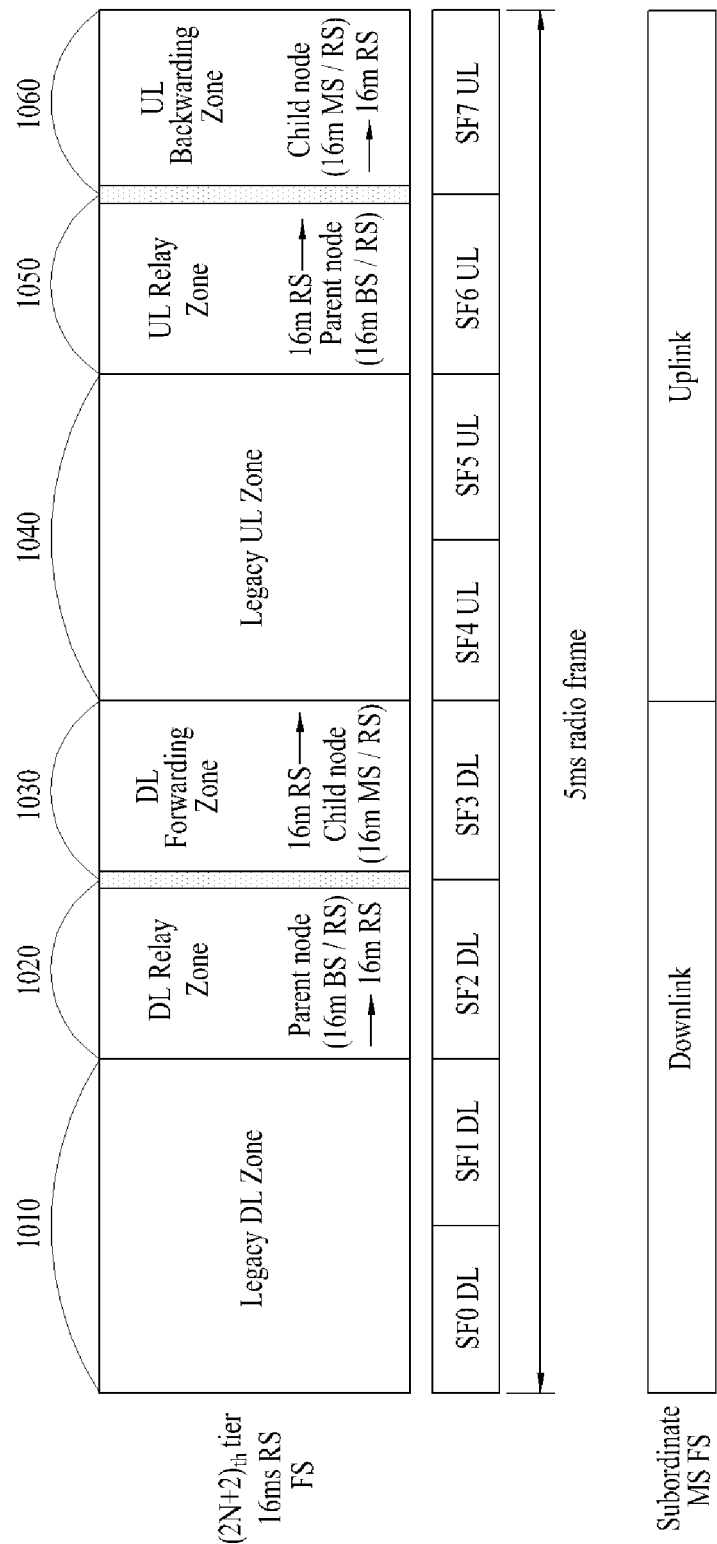
FIG. 10 is a diagram for an example of a frame structure of an even-hop relay station and an example of a frame structure of a subordinate terminal.

FIG. 10 is a diagram for an example of a frame structure of an even-hop relay station and an example of a frame structure of a subordinate mobile station.

Referring to FIG. 10, a frame includes a downlink subframe and an uplink subframe. A downlink subframe of an even-hop relay station can include a legacy downlink (DL) access zone 1010, a downlink (DL) relay zone 1020 and a downlink (DL) forwarding zone 1030. And, an uplink subframe of the even-hop relay station can include a legacy uplink (UL) access zone 1040, an uplink (UL) relay zone 1050 and an uplink (UL) backwarding zone 1060.

The downlink relay zone 1020 is an interval in which a base station or a 16m relay station corresponding to a parent mode for a specific 16m relay station communicates with a 16m relay station. In this zone, a 16m base station or a relay station corresponding to a parent node can transmit a signal to a 16m relay station.

The downlink forwarding zone 1030 is an interval in which a 16m relay station communicates with a 16m mobile station or a relay station corresponding to a child node. A 16m relay station is able to transmit a signal to a 16m terminal or a relay station corresponding to its child node.

The uplink relay zone 1050 is an interval in which a 16m relay station communicates with a 16m relay station or a 16m base station corresponding to its parent node. A 16m relay station can transmit a signal to a 16m relay station or a 16m base station corresponding to its parent node.

And, the uplink backwarding zone 1060 is an interval in which a 16m relay station or a 16m base station corresponding to a child node for a specific 16m relay station communicates with a 16m relay station. In this zone, a 16m relay station or a 16m base station corresponding to a child node can transmit a signal to a 16m relay station.

In case of a transmission between relay stations in the above-described access zone, a general interference management between neighbor cells can be applied to the interference between corresponding relay stations. Inter-relay station synchronization, control mechanism and scheduling can be independently performed. Since a transmitting zone cannot become a receiving zone at the same time, and vice versa, it is necessary to perform relay station grouping between a parent node relay station and a child node relay station. In a mobile station-centric frame structure, a mobile station accesses an uplink and downlink irrespective of a layer of a parent node and terminals are aligned with each other.

In the following description, a transmission between relay stations in a relay zone is explained. For instance, in case of an odd-hop relay station, a downlink relay zone can be replaced by a bi-directional receiving zone and an uplink relay zone can be replaced by a bi-directional transmitting zone. In case of an even-hop relay station, a downlink relay zone can be replaced by a bi-directional transmitting zone and an uplink relay zone can be replaced by a bi-directional receiving zone.

Figure 11:
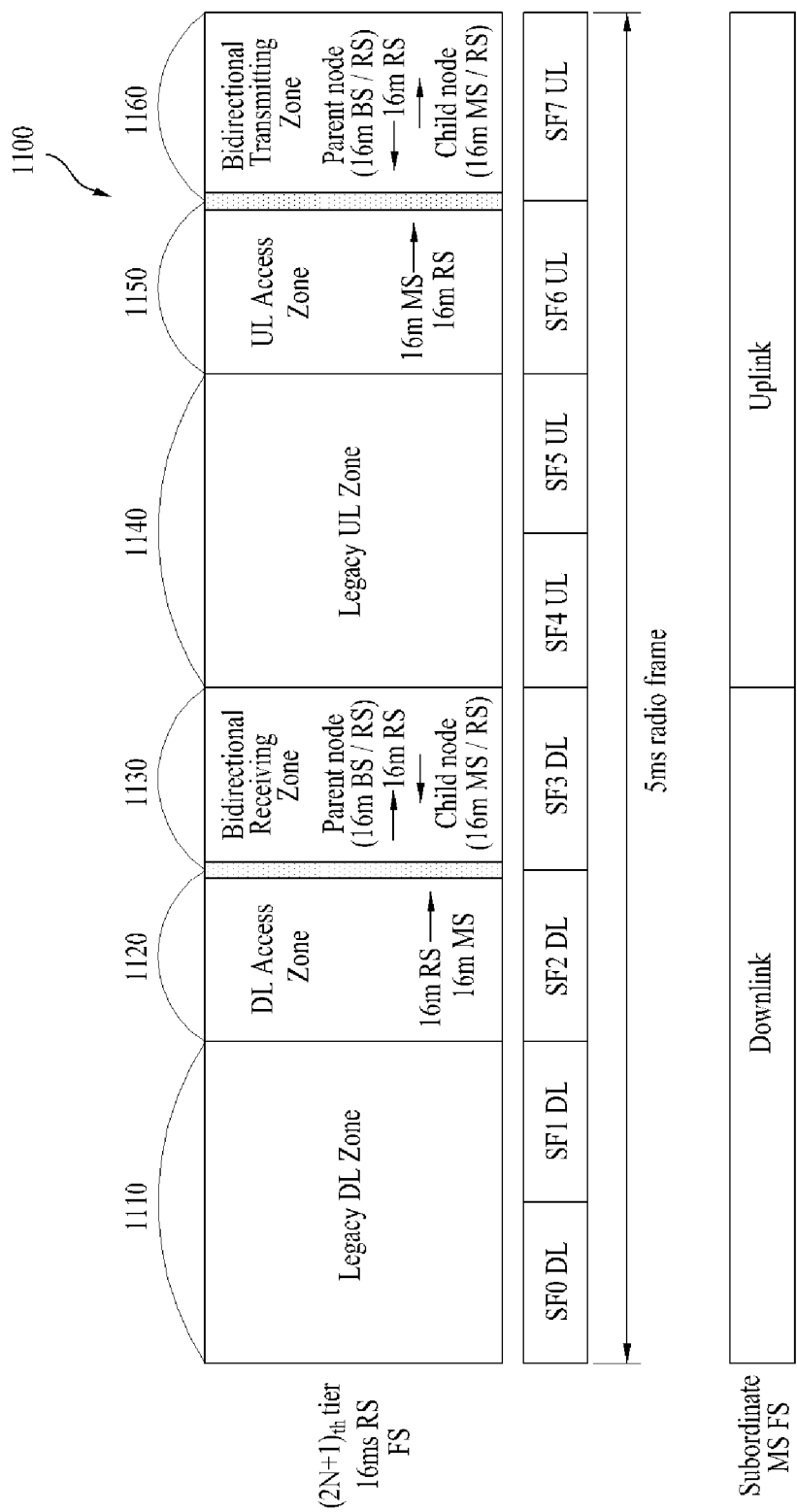
FIG. 11 is a diagram for an example of a frame structure of a relay station supporting a multi-hop relay station and an example of a frame structure of a subordinate terminal.

FIG. 11 is a diagram for an example of a frame structure of a relay station supporting a multi-hop relay station and an example of a frame structure of a subordinate mobile station.

Referring to FIG. 11, a downlink subframe of an odd-hop relay station can include a legacy downlink (DL) zone 1110, a downlink (DL) access zone 1120 and a bidirectional receiving zone 1130. And, an uplink subframe of the odd-hop relay station can include a legacy uplink (UL) zone 1140, an uplink (UL) access zone 1150 and a bidirectional transmitting zone 1160.

The downlink access zone 1120 is an interval in which a 16m relay station and a 16m mobile station communicate with each other. In this zone, a 16m relay station can transmit a signal to a 16m mobile station.

In the bidirectional receiving zone 1130, a 16m relay station can receive a signal from a base station or a 16m relay station corresponding to its parent node and can also receive a signal from a 16m mobile station or a 16m relay station corresponding to its child node.

The uplink access zone 1150 is an interval in which a 16m mobile station and a 16m relay station communicate with each other. In this zone, a 16m mobile station can transmit a signal to a 16m relay station.

In the bidirectional transmitting zone 1160, a 16m relay station can transmit a signal to a base station or a 16m relay station corresponding to its parent node and can also transmit a signal to a 16m mobile station or a 16m relay station corresponding to its child node.

Figure 12:
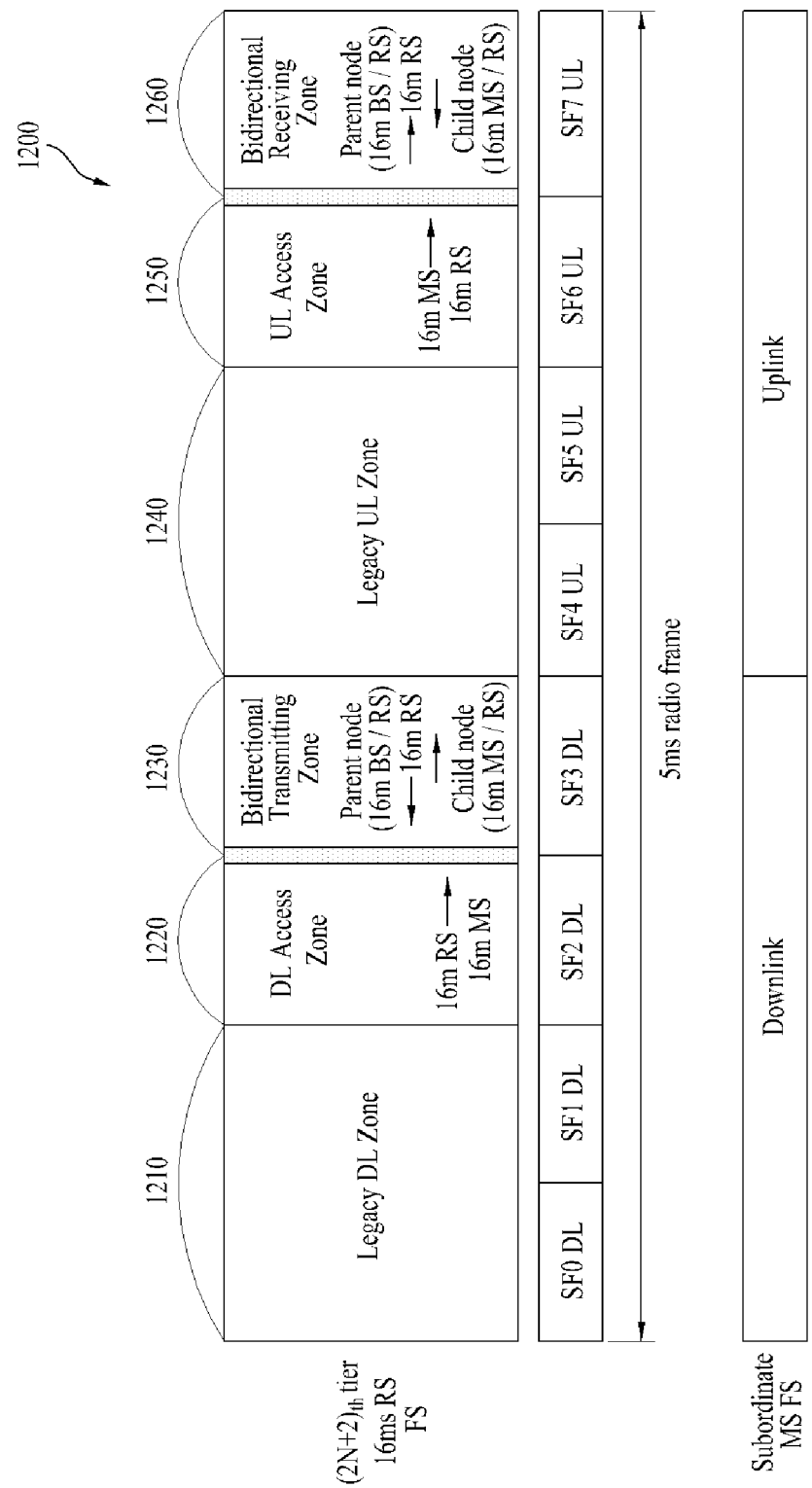
FIG. 12 is a diagram for an example of a frame structure of a relay station supporting a multi-hop relay station and an example of a frame structure of a subordinate terminal.

FIG. 12 is a diagram for an example of a frame structure of a relay station supporting a multi-hop relay station and an example of a frame structure of a subordinate mobile station.

Referring to FIG. 12, a downlink subframe of an even-hop relay station can include a legacy downlink (DL) zone 1210, a downlink (DL) access zone 1220 and a bidirectional transmitting zone 1230. And, an uplink subframe of the even-hop relay station can include a legacy uplink (UL) zone 1240, an uplink (UL) access zone 1250 and a bidirectional receiving zone 1260.

The downlink access zone 1220 is an interval in which a 16m relay station and a 16m mobile station communicate with each other. In this zone, a 16m relay station can transmit a signal to a 16m mobile station.

In the bidirectional transmitting zone 1230, a 16m relay station can transmit a signal to a base station or a 16m relay station corresponding to its parent node and can also transmit a signal to a 16m mobile station or a 16m relay station corresponding to its child node.

The uplink access zone 1250 is an interval in which a 16m mobile station and a 16m relay station communicate with each other. In this zone, a 16m mobile station can transmit a signal to a 16m relay station.

In the bidirectional receiving zone 1260, a 16m relay station can receive a signal from a base station or a 16m relay station corresponding to its parent node and can also receive a signal from a 16m mobile station or a 16m relay station corresponding to its child node.

In case of a transmission between relay stations in a relay zone, it is important whether a specific relay station is operative in a transmitting mode or a receiving mode at a specific timing point irrespective of uplink or downlink. As a downlink access zone and an uplink access zone are allocated to the same subframe, relay station grouping between a parent relay station and a child relay station is possible. In a bidirectional zone, frequency division is necessary between a forward traffic and a backward traffic. Moreover, if downlink and uplink of a terminal are inappropriately matched, interference may be generated. Therefore, it is necessary to perform a division on a frequency domain.

In the following description, explained is a case that inter-relay station transmissions are performed in both an access zone and a relay zone. For instance, in case of an odd-hop relay station, downlink relay and access zones can be replaced by a bidirectional receiving zone. In case of an even-hop relay station, downlink relay and access zones can be replaced by a bidirectional transmitting zone and uplink relay and access zones can be replaced by a bidirectional receiving zone.

Figure 13:
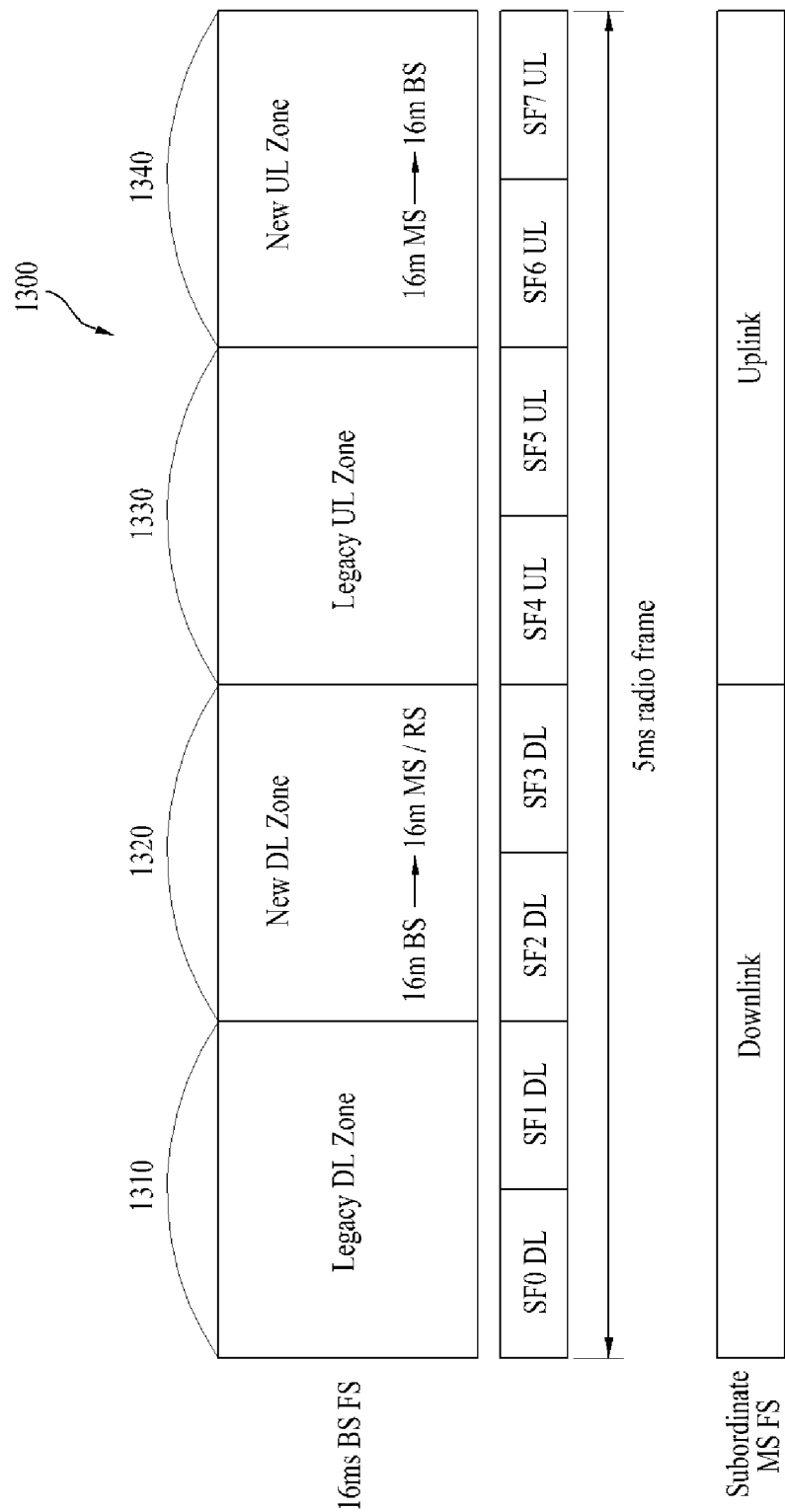
FIG. 13 is a diagram for an example of a frame structure of a base station supporting a multi-hop relay station and an example of a frame structure of a subordinate terminal.

FIG. 13 is a diagram for an example of a frame structure of a base station supporting a multi-hop relay station and an example of a frame structure of a subordinate mobile station.

Referring to FIG. 13, a frame can include a downlink subframe and an uplink subframe. A downlink frame in frames of a base station can include a legacy downlink (DL) zone 1310 and a new downlink (DL) zone 1320. And, an uplink frame in the frames of the base station can include a legacy uplink (UL) zone 1330 and a new uplink (UL) zone 1340.

The new downlink zone 1320 is an interval in which a base station communicates with a 16m mobile station or a 16m relay station. In this zone, a base station can transmit a signal to a 16m mobile station or a 16m relay station.

The new uplink zone 1340 is an interval in which a 16m mobile station and a base station communicate with each other. In this zone, a 16m mobile station can transmit a signal to a base station.

Figure 14:
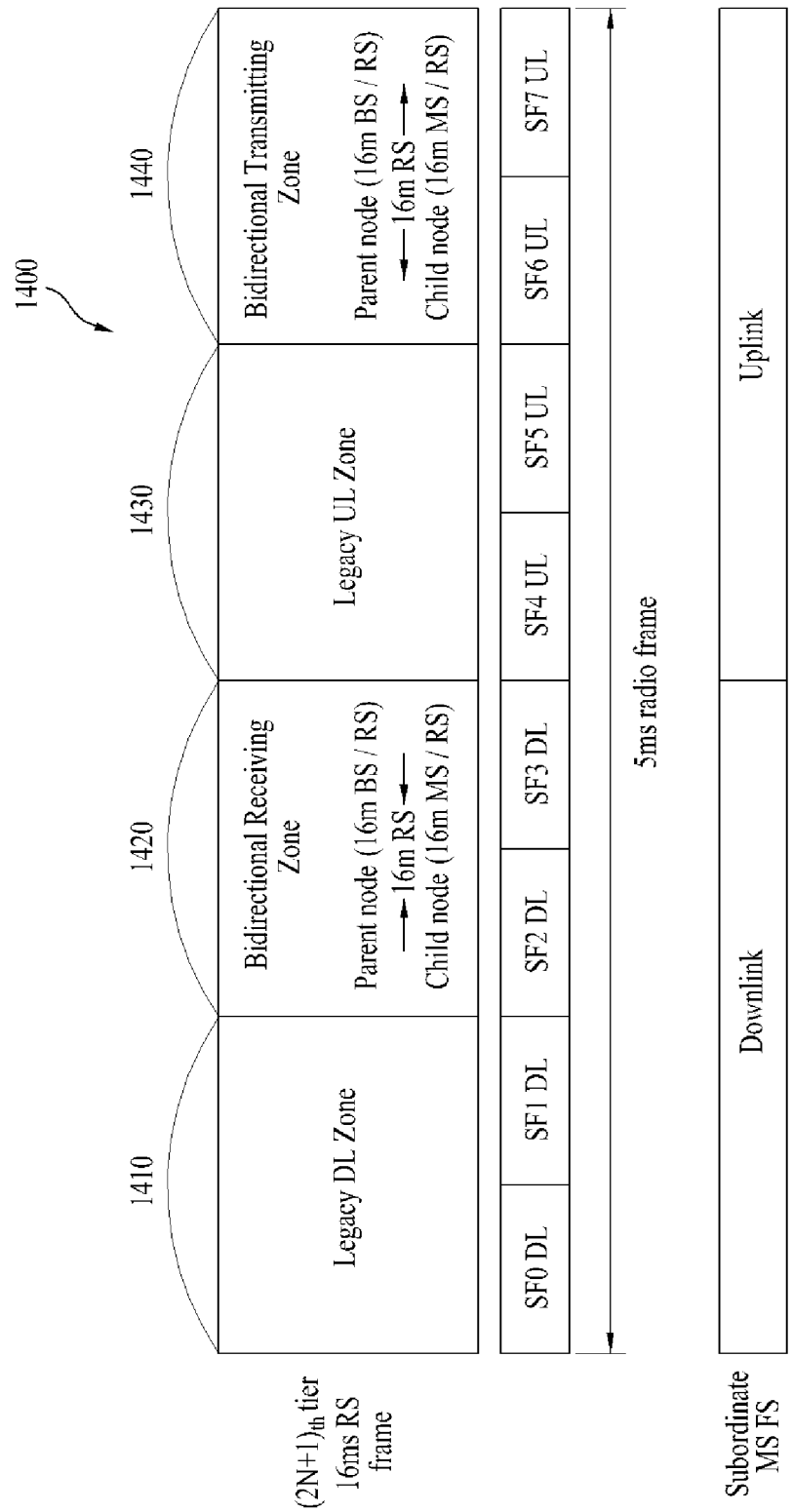
FIG. 14 is a diagram for an example of a frame structure of a relay station supporting a multi-hop relay station and an example of a frame structure of a subordinate terminal.

FIG. 14 is a diagram for an example of a frame structure of a relay station supporting a multi-hop relay station and an example of a frame structure of a subordinate mobile station.

Referring to FIG. 14, a downlink subframe of an odd-hop relay station can include a legacy downlink (DL) zone 1410 and a bidirectional receiving zone 1420. And, an uplink subframe of the odd-hop relay station can include a legacy uplink (UL) zone 1430 and a bidirectional transmitting zone 1440.

In the bidirectional receiving zone 1420, a 16m relay station can receive a signal from a base station or a 16m relay station corresponding to its parent node and can also receive a signal from a 16m mobile station or a 16m relay station corresponding to its child node.

In the bidirectional transmitting zone 1440, a 16m relay station can transmit a signal to a base station or a 16m relay station corresponding to its parent node and can also transmit a signal to a 16m mobile station or a 16m base station corresponding to its child node.

FIG. 15 is a diagram for an example of a frame structure of a relay station supporting a multi-hop relay station and an example of a frame structure of a subordinate terminal.

Referring to FIG. 15, a downlink subframe of an even-hop relay station can include a legacy downlink (DL) zone 1510 and a bidirectional transmitting zone 1520. And, an uplink subframe of the even-hop relay station can include a legacy uplink (UL) zone 1530 and a bidirectional receiving zone 1540.

In the bidirectional transmitting zone 1520, a 16m relay station can receive a signal from a base station or a 16m relay station corresponding to its parent node and can also receive a signal from a 16m mobile station or a 16m relay station corresponding to its child node.

The embodiments described below are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of operations in the embodiments of the present invention may be changed. Some components or features of one embodiment may be included in another embodiment or may be replaced with corresponding components or features of another embodiment.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The method for transmitting a signal using a relay station according to the present invention is applicable industrially.

The invention claimed is:

1. A method for transmitting a signal at a relay station using a Time Division Duplex (TDD) frame structure comprising a plurality of TDD frames, in a wireless communication system, the method comprising:
communicating, at the relay station, with at least one child station and a parent station during a downlink interval and an uplink interval,
wherein the downlink interval comprises a downlink access zone located at a beginning of the downlink interval for transmitting a first signal to the at least one child station, a downlink common zone located at an end of the downlink interval for receiving a second signal from the parent station and a first gap zone located between the downlink access zone and the downlink common zone such that the downlink access zone is immediately followed by the first gap and the first gap is immediately followed by the downlink common zone,
wherein the uplink interval comprises a uplink access zone located at a beginning of the uplink interval for receiving a third signal from the at least one child station, an uplink common zone located at an end of the uplink interval for transmitting a fourth signal to the parent station and a second gap within the uplink interval is located between the uplink access zone and the uplink common zone such that the uplink access zone is immediately followed by the second gap and the second gap is immediately followed by the uplink common zone,
wherein the parent station comprises a base station and the at least one child station comprises a mobile station,
wherein the relay station transmits the first signal to the mobile station via the downlink access zone in the downlink interval and receives the second signal from the base station via the downlink common zone in the downlink interval, and wherein the relay station receives the third signal from the mobile station via the uplink access zone in the uplink interval and transmits the fourth signal to the base station via the uplink common zone in the uplink interval.

2. The method of claim 1, wherein:

the downlink access zone comprises a first downlink access zone and a second downlink access zone;

the relay station transmits the first signal to a first child station that is using a first wireless communication scheme via the first downlink access zone; and the relay station transmits the first signal to a second child station that is using a second wireless communication scheme via at least the first downlink access zone or the second downlink access zone.

3. The method of claim 2, wherein:

the downlink relay zone comprises a first downlink common zone and a second downlink common zone;

the relay station receives the second signal corresponding to the first child station from the parent station via the first downlink common zone in the relay interval; and the relay station receives the second signal corresponding to the second child station from the parent station via either the first downlink common zone or the second downlink common zone in the relay interval.

4. The method of claim 3, wherein time division multiplexing (TDM) or frequency division multiplexing (FDM) is applied to the first and second downlink common zones within the downlink relay zone.

5. The method of claim 1, wherein:

the uplink access zone comprises a first uplink access zone and a second uplink access zone; and the relay station receives the third signal from a first child station using the first wireless communication scheme via the first uplink access zone and from a second child station using a second wireless communication scheme via at least the first uplink access zone or the second uplink access zone.

6. The method of claim 5, wherein:

the uplink relay zone comprises a first uplink common zone and a second uplink common zone;

the relay station transmits the fourth signal received from the first child station to the parent station via the first uplink common zone; and the relay station transmits the fourth signal received from the second child station to the parent station via either the first uplink common zone or second uplink common zone.

7. The method of claim 6, wherein time division multiplexing (TDM) or frequency division multiplexing (FDM) is applied to the first and second uplink common zones within the uplink common zone.

8. A method for transmitting a signal at a multi-hop relay station using Time Division Duplex (TDD) frame structure comprising a plurality of TDD frames, in a wireless communication system, the method comprising:

transmitting, at the relay station, a signal to a child node via a downlink access zone in a downlink interval;

either receiving, via a downlink bi-directional zone in the downlink interval, signals from both a parent node and the child node or transmitting, via the downlink bi-directional zone in the downlink interval, signals to both the parent node and the child node;

receiving, at the relay station, a signal from the child node via an uplink access zone in an uplink interval; and either transmitting via an uplink bi-directional zone in the uplink interval, signals to both the parent node and the child node or receiving, via the uplink bi-directional zone in the uplink interval, signals from both the parent node and the child node, wherein the downlink bi-directional zone and the uplink bi-directional zone apply frequency division multiplexing (FDM) within the TDD frame structure for bi-directionally communicating with both the parent node and the child node, wherein the parent node comprises a base station, wherein the child node comprises a subordinate mobile station, wherein the relay station transmits signals to the mobile station via the downlink access zone in the downlink interval and then either receives, via the downlink bi-directional zone in the downlink interval, signals from both the base station and the subordinate mobile station or transmits, via the downlink bi-directional zone in the downlink interval, signals to both the base station and the subordinate mobile station, and wherein the relay station receives signals from the mobile station via the uplink access zone in the uplink interval and then either transmits, via the uplink bi-directional zone in the uplink interval, signals to both the base station and the subordinate mobile station or receives, via the uplink bi-directional zone in the uplink interval, signals from both the base station and the subordinate mobile station.

9. The method of claim 8, wherein a subordinate even-hop relay station transmits a signal to the base station or a superordinate odd-hop relay station and transmits a signal to the subordinate mobile station or a subordinate odd-hop relay station, when an odd-hop relay station distant from the base station by an odd-hop number receives a signal from the base station or a superordinate even-hop relay station and receives a signal from the subordinate mobile station or a subordinate even-hop relay station.

10. The method of claim 8, wherein a subordinate even-hop relay station receives a signal from the base station or a superordinate odd-hop relay station and receives a signal from the subordinate mobile station or a subordinate odd-hop relay station, when the relay station corresponding to an odd hop distant from the base station by an odd-hop number transmits a signal to the base station or a superordinate even-hop relay station and transmits a signal to the subordinate mobile station or a subordinate even-hop relay station.

11. The method of claim 8, wherein a subordinate even-hop relay station receives a signal from the base station or a superordinate odd-hop relay station and receives a signal from the subordinate mobile station or a subordinate odd-hop relay station, when the relay station corresponding to an odd hop distant from the base station by an odd-hop number transmits a signal to the base station or a superordinate even-hop relay station and transmits a signal to the subordinate mobile station or a subordinate even-hop relay station.

12. The method of claim 8, wherein a subordinate even-hop relay station transmits a signal to the base station or a superordinate odd-hop relay station and transmits a signal to the subordinate mobile station or a subordinate odd-hop relay station, when the relay station corresponding to an odd hop distant from the base station by an odd-hop number receives a signal from the base station or a superordinate even-hop relay station and receives a signal from the subordinate mobile station or a subordinate even-hop relay station.

13. The method of claim 1, wherein the relay station is in direct communication with the parent station.

14. The method of claim 1, wherein the child station is another relay station or a mobile station.

15. The method of claim 1, wherein the parent station is a base station or another relay station.

* * * * *